(12) United States Patent
Yan et al.

(10) Patent No.: US 8,656,151 B2
(45) Date of Patent: Feb. 18, 2014

(54) SERVICE ACCESSING CONTROL METHOD, TERMINAL AND SYSTEM

(75) Inventors: Min Yan, Shenzhen (CN); Caishi Yang, Shenzhen (CN); Liang Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 614 days.

(21) Appl. No.: 12/647,851

(22) Filed: Dec. 28, 2009

(65) Prior Publication Data

US 2010/0146271 A1   Jun. 10, 2010

Related U.S. Application Data

(63) Continuation of application No. PCT/CN2008/070587, filed on Mar. 26, 2008.

(30) Foreign Application Priority Data

Jun. 29, 2007   (CN) .......................... 2007 1 0118168

(51) Int. Cl.
  *H04L 29/06* (2006.01)
  *H04K 1/00* (2006.01)
  *A63F 9/24* (2006.01)
  *A63F 13/00* (2006.01)
  *G06F 17/00* (2006.01)
  *G06F 19/00* (2011.01)

(52) U.S. Cl.
  USPC .............................. 713/150; 380/251; 463/29

(58) Field of Classification Search
  USPC ....................................................... 713/150
  See application file for complete search history.

(56) References Cited

U.S. PATENT DOCUMENTS

| | | | |
|---|---|---|---|
| 6,699,125 B2 | 3/2004 | Kirmse et al. | |
| 7,031,473 B2 * | 4/2006 | Morais et al. | 380/251 |
| 7,340,058 B2 * | 3/2008 | Jakobsson et al. | 380/251 |
| 7,512,235 B2 * | 3/2009 | Multerer et al. | 380/251 |
| 2002/0086732 A1 | 7/2002 | Kirmse et al. | |

(Continued)

FOREIGN PATENT DOCUMENTS

| | | |
|---|---|---|
| CN | 101076025 A | 11/2007 |
| JP | 2007129764 A | 5/2007 |
| WO | 01/65545 A2 | 9/2001 |
| WO | 2007048969 A1 | 5/2007 |

OTHER PUBLICATIONS

Karandikar et al, "Secure Group Communication Based Scheme for Differential Access Control in Dynamic Environments" 2005, IEEE.*

International Search Report for International Patent Application No. PCT/CN2008/070587, dated Jun. 26, 2008, and English translation thereof.

(Continued)

*Primary Examiner* — Luu Pham
*Assistant Examiner* — Jahangir Kabir

(57) ABSTRACT

Embodiments of the present invention provide a service accessing control method, including generating a service group comprising more than one client, and generating a key for the service group; searching for, by the more than one client in the service group, a service component on a server, encrypting, by a client who first searches out the service component, the service component with the generated key; and accessing, by the other clients in the service group, the encrypted service component with the generated key. The embodiments of the present further also provide a terminal and system corresponding to the method. By the embodiments of the present invention, it can be guaranteed that a invitation flow is not disturbed by external users, thereby increasing the success rate of the invitation.

6 Claims, 10 Drawing Sheets

(56) References Cited

U.S. PATENT DOCUMENTS

| | | | |
|---|---|---|---|
| 2002/0116615 A1* | 8/2002 | Nguyen et al. | 713/168 |
| 2004/0165728 A1* | 8/2004 | Crane et al. | 380/279 |
| 2005/0027382 A1* | 2/2005 | Kirmse et al. | 700/91 |
| 2006/0080702 A1* | 4/2006 | Diez et al. | 725/30 |
| 2006/0093142 A1* | 5/2006 | Schneier et al. | 380/251 |
| 2006/0178216 A1* | 8/2006 | Shea et al. | 463/42 |
| 2006/0179478 A1 | 8/2006 | Han et al. | |
| 2006/0258463 A1* | 11/2006 | Cugno et al. | 463/42 |
| 2006/0287099 A1* | 12/2006 | Shaw et al. | 463/42 |

OTHER PUBLICATIONS

"Halo 2 Game Manual"; Bungie Studios/Microsoft Game Studios; 2004; 20 pages.

Great Britain Office Action for Great Britain Application No. 1001493.4, dated Aug. 31, 2011.

Great Britain Office Action for Great Britain Application No. 1001493.4, dated Dec. 28, 2011.

Chinese Office Action for Chinese Patent Application No. 2007101181682, dated May 8, 2009, and English translation thereof.

Canadian Office Action for Canadian Patent Application No. 2,691,859, dated May 3, 2012.

\* cited by examiner

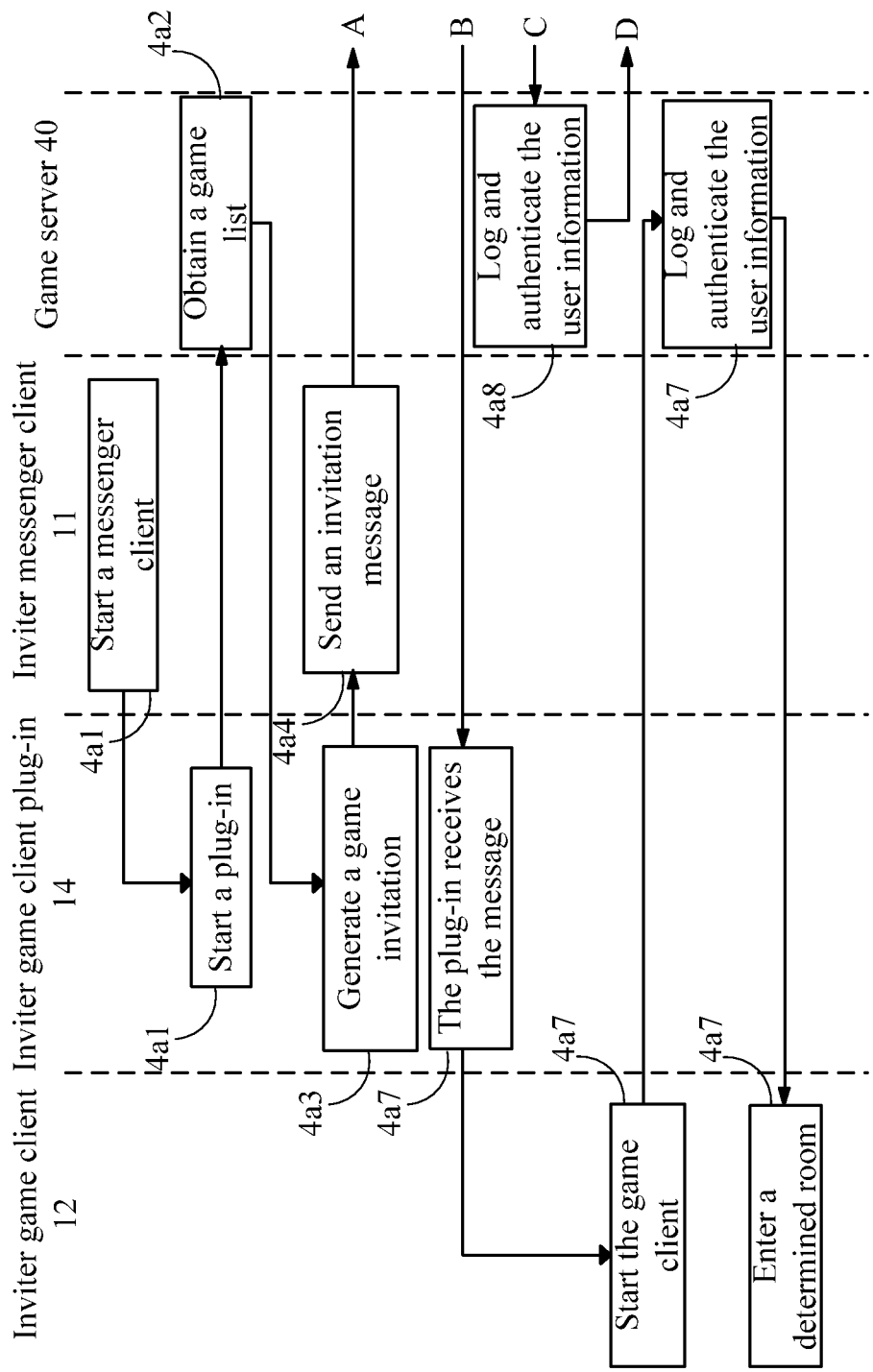
Figure 4a (1)

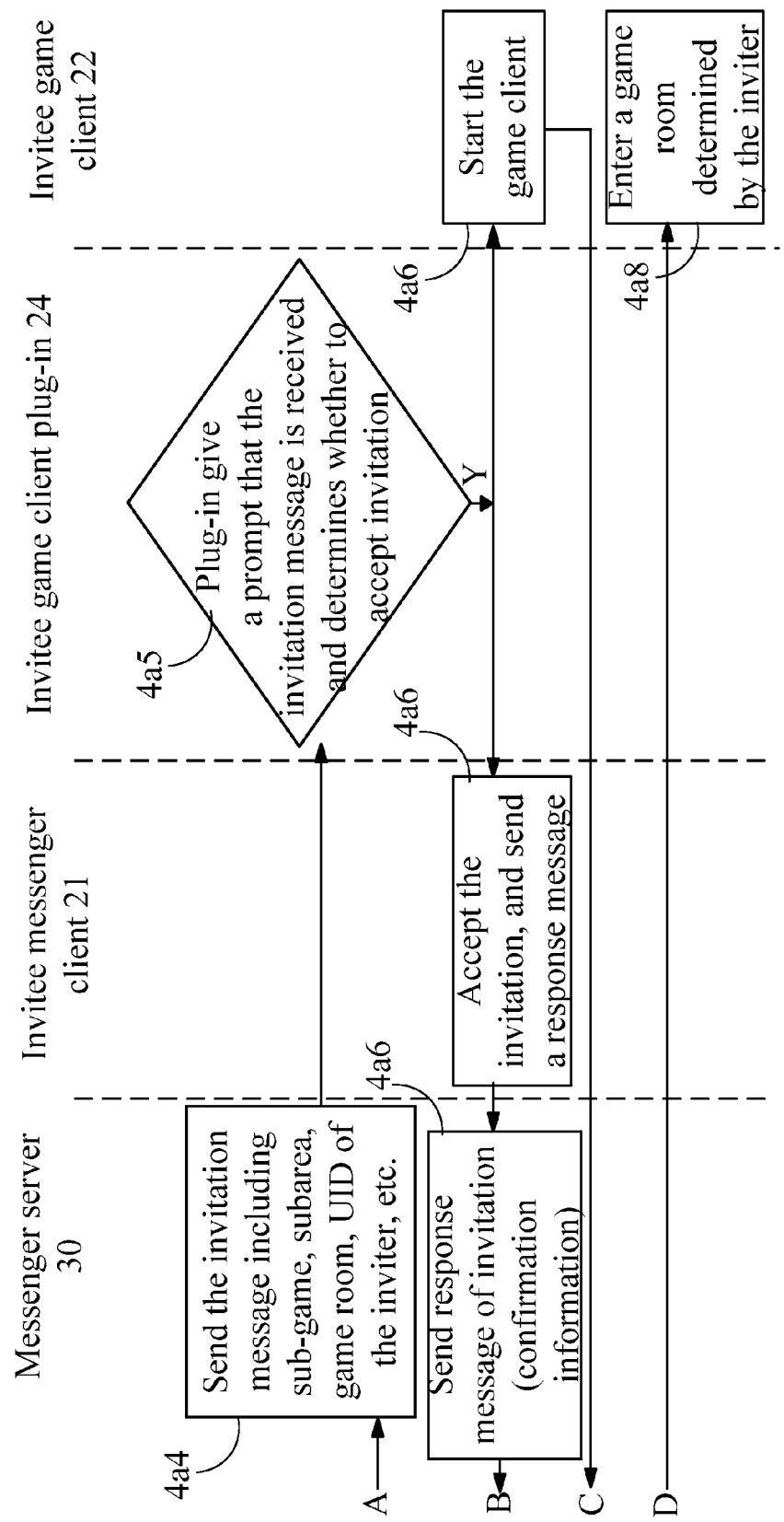
Figure 4a (2)

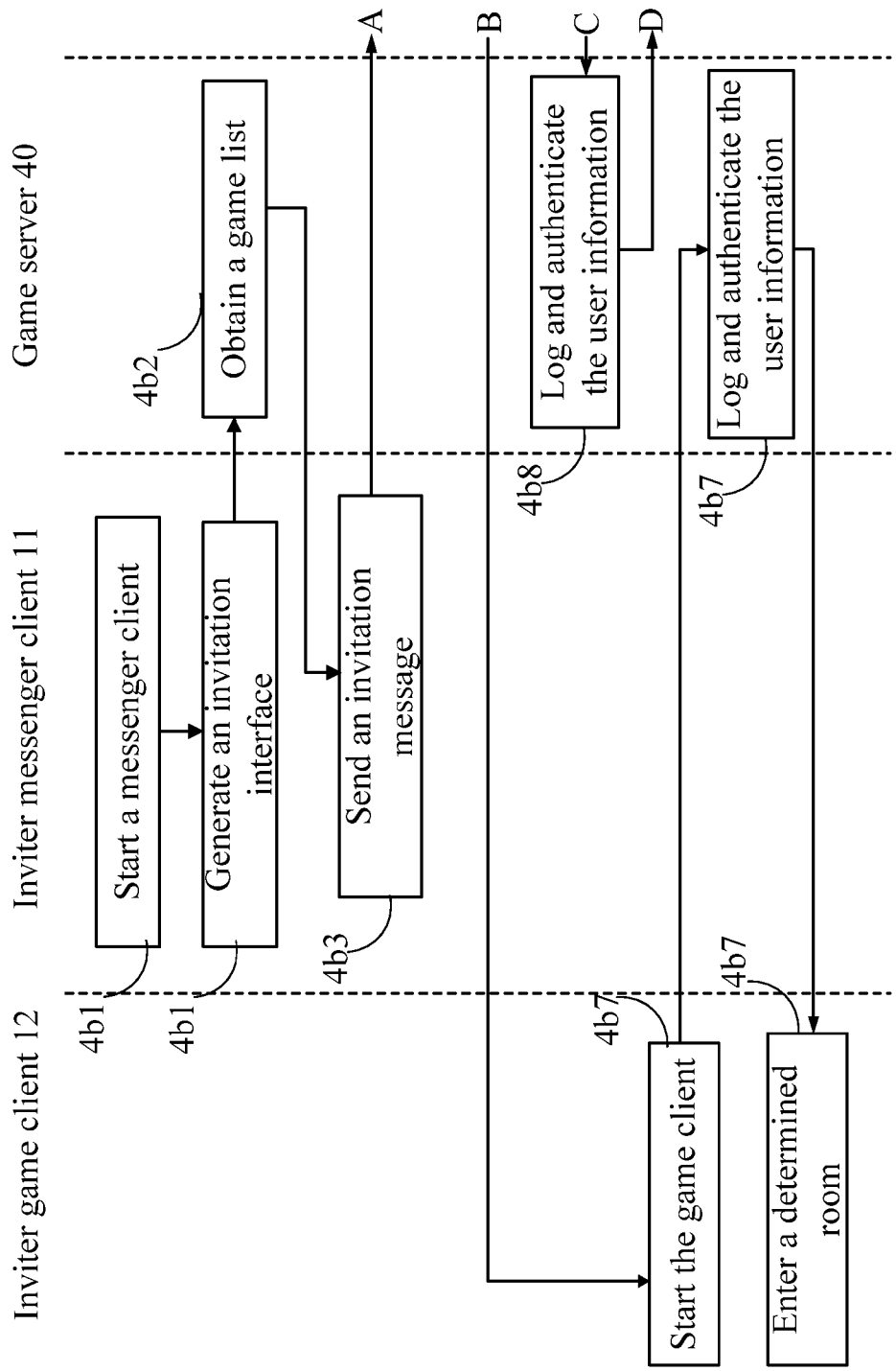
Figure 4b (1)

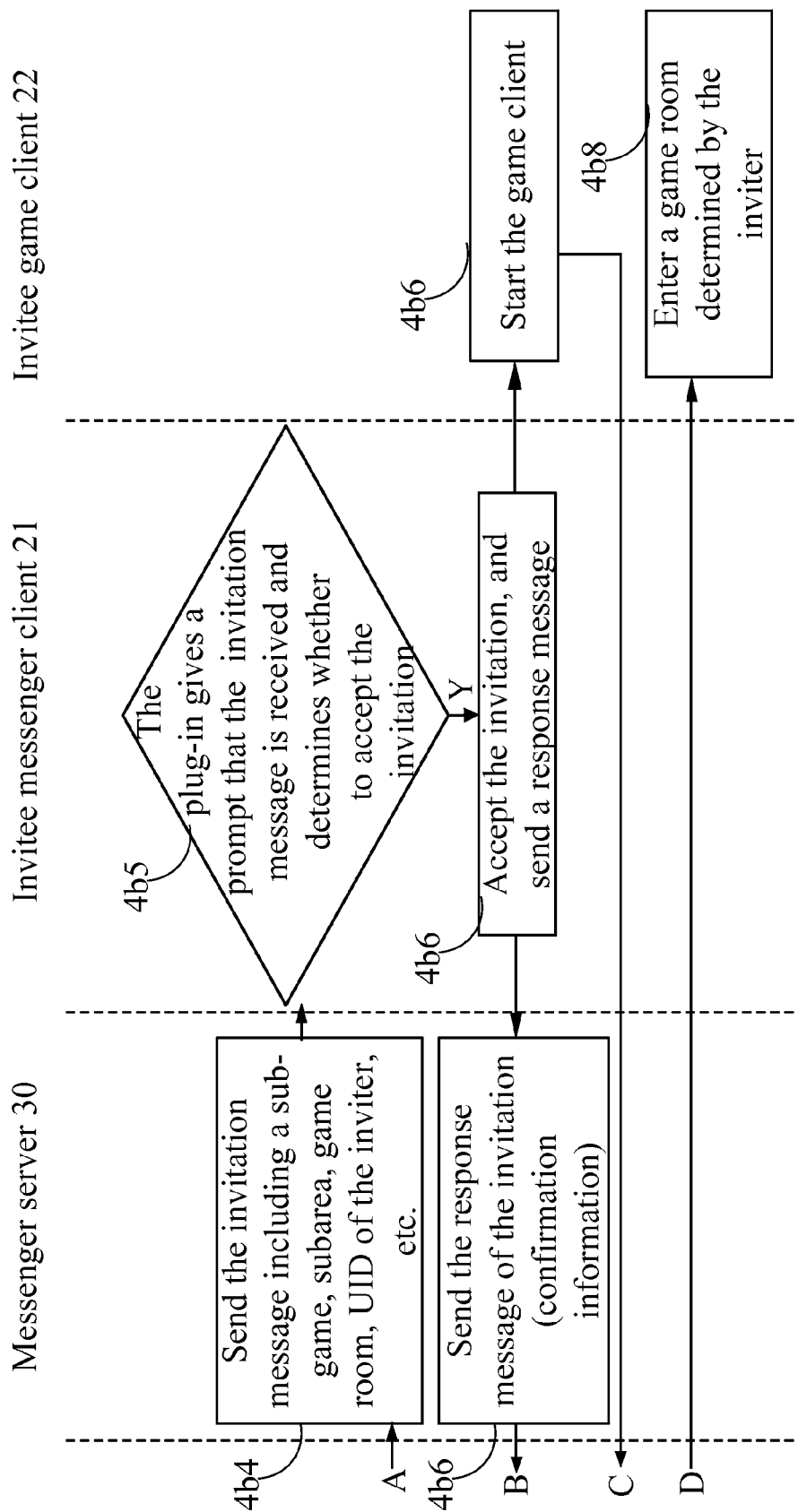
Figure 4b (2)

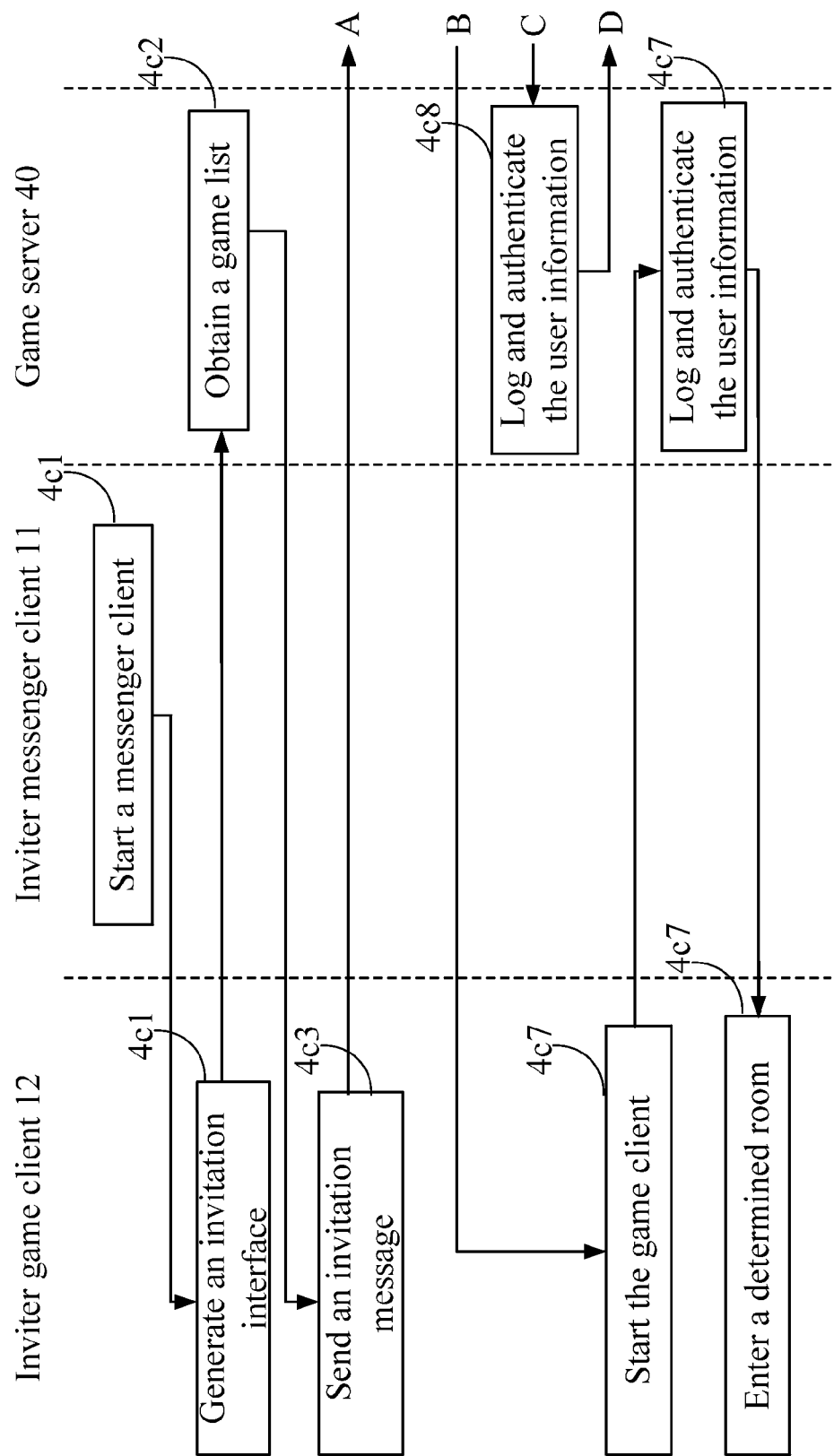
Figure 4c (1)

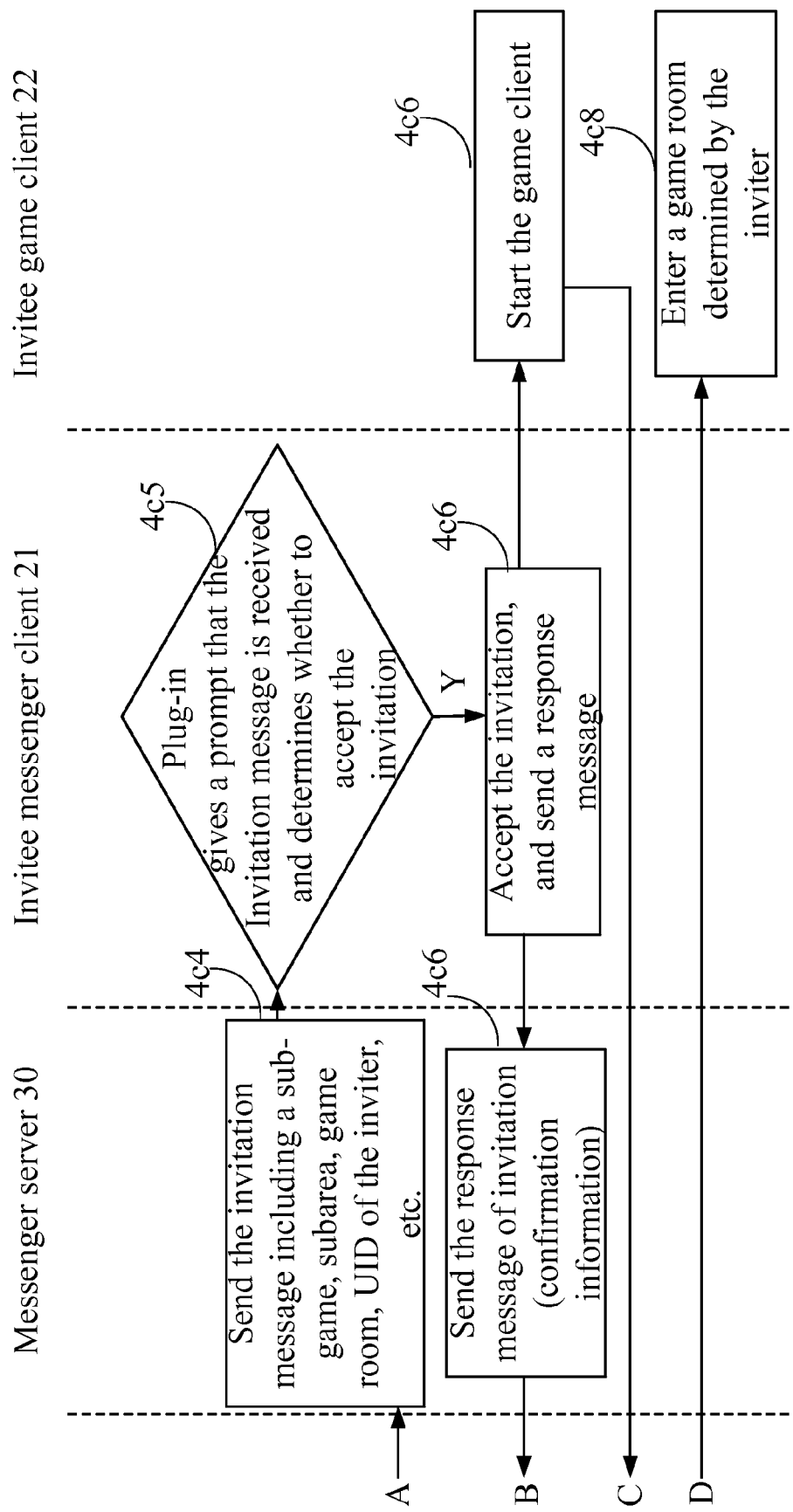
Figure 4c (2)

SERVICE ACCESSING CONTROL METHOD, TERMINAL AND SYSTEM

CROSS-REFERENCE TO RELATED APPLICATIONS

This application is a continuation of International Application No. PCT/CN2008/070587, filed Mar. 26, 2008. This application claims the benefit and priority of Chinese Application No. 200710118168.2, filed Jun. 29, 2007. The entire disclosures of each of the above applications are incorporated herein by reference.

FIELD

The present disclosure relates to Instant Messaging (IM) technologies, and more particularly, to a service accessing control method, terminal and system.

BACKGROUND

This section provides background information related to the present disclosure which is not necessarily prior art.

In the current Internet applications, various IM-based applications and services, such as a multi-player online game and so on, are more and more widely popularized and used along with the rapid development of the IM. The multi-player online game refers to that a user initiates an invitation at his own messenger client, invites two or more than two users to participate in a same game, so that the multi-player online game is implemented.

In the prior art, there is a more mature scheme for implementing the multi-player online game. Take a situation that two users participate in a same game as an example, a conventional system for implementing the online game at least includes: an inviter messenger client, a game server, a messenger server, an invitee messenger client, an inviter game client and an invitee game client. Generally, the game client is called a game hall. There are multiple progresses or components for implementing a special game on the game server. These progresses or components allow multiple players (clients) to access them, to implement a function that multiple players play a specific game together. Generally, such a progress is called a game table. The number of users (clients) allowed to access each game table is called a seat number or game location number of the game table. An operation that a client accesses a game process or component is called that the user enters the game table or the user occupies a game location (seat). In addition, for the convenience of management, similar game progresses or components on a same game server are divided into multiple groups, each group is called a game room, and each game room may have multiples game tables. In some situations, the game progress or component is also directly called a game room.

In the prior art, a special game location is selected by the inviter game client, and the system automatically notifies the invitee game client of the game location. In this situation, there is a problem that if one game location, e.g. a seat of one game table, is occupied by another user before the invitee enters the game table, the invitee can enter the same game room, but can not enter the same game table.

Specifically, it requires a quite long time between entering a special game location by the inviter game client and entering a selected game location of a corresponding game by the invitee. After selecting a game table, the inviter game client can not guarantee that there is an empty seat before the invitee game client entering the game table. It is very likely that all empty seats of the game table at which the inviter game client is located are occupied by other users before the invitee game client enters the game table, thereby resulting in that the invitation can not be implemented.

SUMMARY

This section provides a general summary of the disclosure, and is not a comprehensive disclosure of its full scope or all of its features.

Embodiments of the present invention provide a service accessing control method, terminal and system, to solve the problem that the conventional method can not implement the invitation of the service.

An embodiment of the present invention provides a service accessing control method, including:
  generating a service group comprising more than one client, and generating a key for the service group;
  searching for, by the more than one client in the service group, a service component on a server;
  encrypting, by a client who first searches out the service component, the service component with the generated key; and
  accessing, by the other clients in the service group, the encrypted service component with the generated key.

Another embodiment of the present invention provides a service accessing control terminal, including:
  a first module, configured to participate in a service group comprising more than one client, and generate a key for the service group; and
  a second module, configured to search for a service component on a server, access and encrypt the service component with the key generated by the first module.

Another embodiment of the present invention provides a service accessing control terminal, including:
  a first module, configured to participate in a service group comprising more than one client, and generate a key for the service group; and
  a second module, configured to access an encrypted service component with the key generated by the first module after receiving from the other clients a notification indicating that the available service component is searched out.

Another embodiment of the present invention provides a service accessing control system, including:
  a server, configured to manage a service component;
  a first client, configured to participate in a service group comprising more than one client, generates a first key for the service group, search for the service component on the server, access and encrypt the service component with the generated first key; and
  a second client, configured to participate in the service group comprising more than one client, generate a second key for the service group, and access the encrypted service component with the generated second key after receiving from the other clients a notification indicating that the available service component is searched out.

In the technical solution provided by the embodiments of the present invention, the service group is generated by the mode of invitation to access the service component, and the service component is encrypted, which enables all clients in the service group to execute the service in a same service component, thereby increasing the success rate of the invitation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4a is a simplified flowchart illustrating that a function plug-in initiates an invitation according to an embodiment of the present invention.

FIG. 4b is a simplified flowchart illustrating that a messenger client initiates an invitation according to an embodiment of the present invention.

FIG. 4c is a simplified flowchart illustrating that a messenger client triggers a game client to initiate an invitation according to an embodiment of the present invention.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
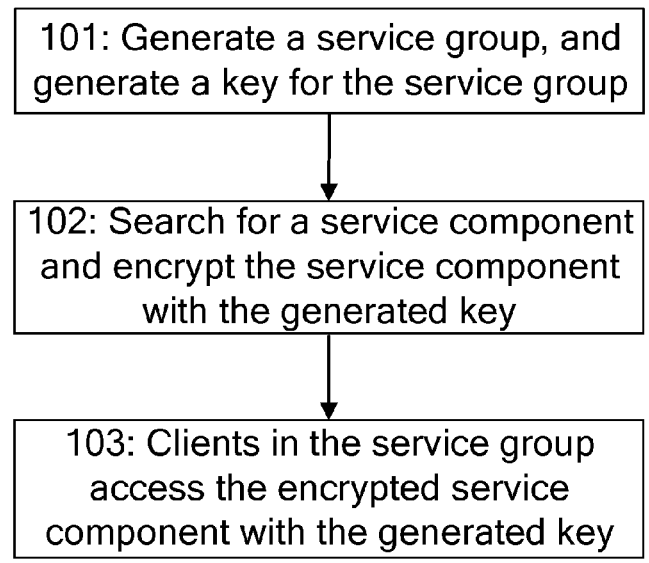
FIG. 1 is a simplified flowchart illustrating a service accessing control method according to an embodiment of the present invention.

Therefore, an embodiment of the present invention provides a service accessing control method. As shown in FIG. 1, the method includes the following steps.

In Step 101, a service group including more than one client is generated, and a key is generated for the service group.

In Step 102, a service component is searched on the server, and is encrypted with the key generated in Step 101. Here, the number of users allowed to access the service component is larger than or equal to the number of clients in the service group.

In Step 103, the clients in the service group access the encrypted service component with the key generated in Step 101.

The technical solution of the present invention is described hereinafter in detail according to specific embodiments. In the following embodiments, the service mentioned in the technical solution of the present invention is an online game. The service group is an aggregate of all clients participating in an online game invitation. The service component is a game progress or component.

The embodiments of the present invention includes that: an inviter and an invitee confirm an invitation, and enter a preset game room after logging and being authenticated; the client of the inviter or the client of the invited client generates an encryption key, and a client who first enters a target game table in the invitation encrypts the obtained target game table with the encryption key on the game server, i.e. writes the encryption key into an accessing right parameter of the target game progress or component; and another client decrypts the target game table with the encryption key after determining the location of the target game table, i.e. if the encryption key generated by another client is identical with the key in the accessing right parameter of the target game progress or component, the client may enter the target game table. In this way, it can be guaranteed that each client can successfully enter the target game table, thereby ensuring success rate of the game invitation. In the progress of the invitation, a server, i.e. a game server, may save Unique Identities (UIDs) of all clients in this invitation. After determining that the UIDs of the clients currently accessing the service component include UIDs of all clients in the server group, the server decrypts the service component.

Here, the target game table can be obtained by the inviter or the invitee. It can be predefined which obtains the target game table, or a game table first obtained by any one of the inviter and the invitee is taken as the target game table.

The encryption key is generated by the inviter or the invitee in a predefined mode. That is to say, the one obtaining the target game table generates the encryption key in the predefined mode and encrypts the target game table on the game server. After searching out the target game table, the other one also generates the encryption key in the predefined mode, and decrypts the target game table with the generated encryption key and enters the target game table. The searching may be performed according to the UID of the one obtaining the game table. It is not limited that which mode is used for generating the encryption key. Any existing encryption algorithm, e.g. a Data Encryption Standard (DES) algorithm, a 3DES algorithm, a Diffie-Hellman (DH) algorithm, etc. may be used, and the UID of the inviter or the invitee may also be directly used as the encryption key.

When a user invites multiple users, the process of inviting multiple users by the user may be divided into multiple processes of inviting one user for one time by the user. Through the above mode, after one user is invited to enter the game table, the next user is invited. Alternatively, it may be predefined that all clients generate the same encryption key with a specific algorithm, and enter the game table with the same encryption key. It may also be predefined that the encryption key of the game table is a key packet including the UIDs of all clients in this invitation, and each client in this invitation may decrypt the game table with its own UID and enter the game table.

Since the encryption key is generated by the client of the inviter or the client of the invitee in a predefined mode, the encryption key may be generated at any time after the mode of generating the encryption key is predefined.

Figure 2:
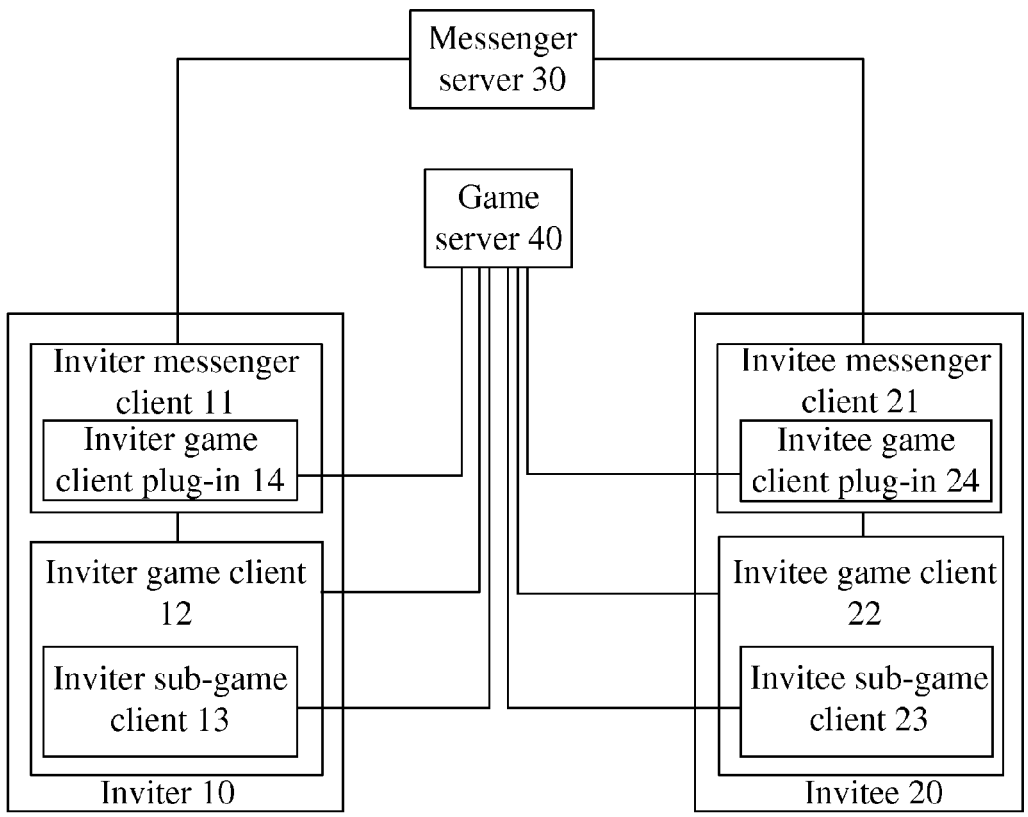
FIG. 2 is a block diagram illustrating a system for implementing an online game invitation according to an embodiment of the present invention.

As shown in FIG. 2, a system for implementing an online game invitation according to an embodiment of the present invention at least includes: an inviter 10, an invitee 20, a messenger server 30 and a game server 40. Both the inviter 10 and the invitee 20 connect with the messenger server 30 and the game server 40. The inviter 10 mentioned here refers to an aggregation of the hardware and software used by a user who initiates the invitation, and may also be called the client of the inviter 10. The invitee 20 refers to an aggregation of the hardware and software used by a user who is invited, and may also be called the client of the invitee 20. The messenger server 30 is configured to connect with messenger clients of all users and implement such functions as querying user status, managing a good friend list, forwarding a message and so on. The game server 40 is configured to connect with game clients and messenger clients of all users and implement such functions as releasing a game, setting and executing a game rule, querying user status, forwarding game information, authorizing and managing a game account, recording a bill, pushing an advertisement and so on.

The inviter 10 further includes an inviter messenger client 11 and an inviter game client 12. The inviter game client 12 may further include an inviter sub-game client 13. The inviter messenger client 11 is configured to receive and send information of the inviter 10. The inviter game client 12 is a service client for implementing a specific game service and is configured to implement the following functions of each game of the inviter 10, such as downloading, installing, configuring, managing a good friend list/blacklist, constituting a team, communicating, buying a property, advertising and so on. The inviter sub-game client 13 is configured to implement a specific multiple-person game of the inviter 10. Further, the inviter game client 12 has the functions of obtaining a target game table, generating an encryption key according to a pre-defined mode, searching for a target game table on the game server 40 and encrypting/decrypting the obtained target game table on the game server 40.

The invitee 20 further includes an invitee messenger client 21 and an invitee game client 22. The invitee game client 22 may further include an invitee sub-game client 23. The invitee messenger client 21 is configured to receive and send information of the invitee 20. The invitee game client 22 is a service client for implementing a specific game service and is configured to implement the following functions of each game of the invitee 20, such as downloading, installing, configuring, managing a good friend list/blacklist, constituting a team, communicating, buying a property, advertising and so on. The invitee sub-game client 13 is configured to implement a specific multiple-person game of the invitee. Further, the invitee game client 22 has the functions of obtaining a target game table, generating an encrypting key according to a pre-defined mode, searching for a target game table on the game server 40 and encrypting/decrypting the obtained target game table on the game server 40.

A function plug-in may be respectively embedded into the inviter messenger client 21 and the invitee messenger client 22. The inviter game client plug-in 14 is a program plug-in which is compiled according to the requirements of a messenger software interface, is configured to generate a message, initiate an invitation, and implement the communication among the inviter messenger client 11, the inviter game client 12 and the game server 40, and is further configured to implement an interactive operation and content display on a user invitation interface of the inviter 10. Information contents which the inviter game client plug-in is able to generate and transfer include, but are not limited to a user account, a user password, game server information, good friend information of a user, game location information of the user, game content information of the user, game location information of a good friend of the user and game content information of the good friend of the user, etc. The invitee game client plug-in 24 is a program plug-in which is compiled according to the requirements of a messenger software interface, is configured to generate a message, initiate an invitation, and implement the communication among the invitee messenger client 21, the invitee game client 22 and the game server 40, and is further configured to implement an interactive operation and content display on a user invitation interface of the invitee 20. Information contents which the invitee game client plug-in is able to generate and transfer include, but are not limited to a user account, a user password, game server information, good friend information of a user, game location information of the user, game content information of the user, game location information of a good friend of the user and game content information of the good friend of the user, etc.

If the function plug-ins are not set in the inviter and the invitee, it is the inviter messenger client and the invitee messenger client that implement the generation and receipt of the invitation message and the response message, the interactive operation and content display on the user invitation interface.

Figure 3:
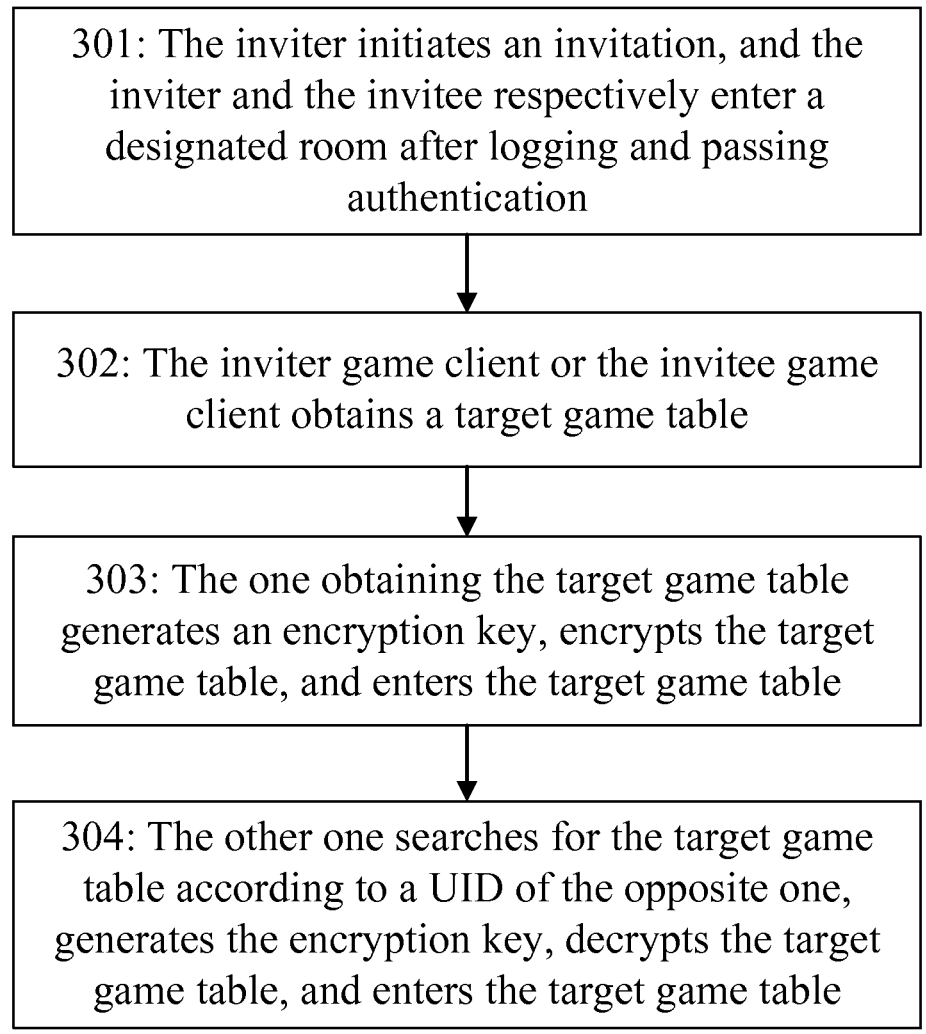
FIG. 3 is a simplified flowchart illustrating a method for implementing an online game invitation according to an embodiment of the present invention.

Based on the system structure shown in FIG. 2, a flow illustrating a method for implementing an online game invitation according to an embodiment of the present invention is shown in FIG. 3. The method includes the following steps.

Step 301: An inviter initiates an invitation, and the inviter and an invitee respectively initiate their game clients after the invitee determines to accept the invitation. The inviter game client and the invitee respectively log on a game server, and enter a game room designated by the inviter after passing the authentication of the game server.

An invitation message initiated by the inviter includes, but is not limited to a UID of the inviter, specific game information, specific game subarea information, specific game room information, network environment information, etc.

The invitation may be initiated after the both game clients are started. The messenger server may collect information of the invitation in the process of the invitation, and send all or part of the information, such as the number of users accepting the invitation and/or UIDs of all clients in the invitation, to the game client of each user in the invitation, i.e. each of the user initiating the invitation and users accepting the invitation.

Step 302: The inviter game client or the invitee game client obtains a target game table. In this embodiment of the present invention, the target game table is obtained through the following modes. The inviter game client or the invitee game client searches for a game table on the game server; here, the number of users allowed to access the game table is larger than or equal to the number of users in the invitation. If a certain game client first searches out a game table meeting the condition and enters the game table, it is regarded that the game client obtains the target game table.

Step 303: The one obtaining the target game table generates an encryption key according to a predefined mode, encrypts the obtained target game table on the game server, and enters the target game table.

In this step, the encryption key used for encrypting the target game table may be generated at any time after the mode of generating the encryption key is defined, e.g., generated after the invitee determines to accept the invitation.

Step 304: The other one searches for the target game table on the game server with the UID of the opposite one, generates the encryption key according to the predefined mode after searching out the target game table, decrypts the target game table with the encryption key, and enters the target game table. Then, the two parties begin to play a game.

In this step, if the other one is the invitee that is to say, the one obtaining the target game table is the inviter, the UID of the opposite one is obtained from an invitation message sent from the inviter; if the other one is the inviter, that is to say, the one obtaining the target game table is the invitee, the UID of the opposite one may be obtained from an invitation response returned by the invitee.

The method provided by this embodiment of the present invention further includes releasing the encryption key currently used by the target game table after both the inviter and the invitee enter the target game table.

The method provided by this embodiment of the present invention further includes that the inviter and the invitee respectively start their sub-game clients and begin to play the game after entering the target game table.

In Step 301 of the method provided by this embodiment of the present invention, the inviter may initiate the invitation in the following three modes: when the inviter game client plug-in 14 is embedded in the inviter messenger client 11, the inviter game client plug-in 14 initiates the invitation; or the inviter messenger client 11 directly initiates the game invitation; or the inviter messenger client 11 triggers the inviter game client 12 to initiate the invitation. FIGS. 4a-4c respectively illustrate the processes from initiating the invitation in the above three modes respectively to entering a designated game room by the inviter and the invitee. The processes are described hereafter in detail with reference to the accompanying drawings.

FIG. 4a shows a flow that the inviter game client plug-in 14 initiates a game invitation. As shown in FIG. 4a, the process from initiating the invitation to entering a designated game room by the inviter and the invitee includes the following steps.

Step 4a1: When wishing to initiate a game invitation to the invitee 20, the inviter 10 first starts its own messenger client 11, and starts the inviter game client plug-in 14 embedded into the inviter messenger client 11 at the same time, generates and displays a game invitation interface.

Step 4a2: The inviter game client plug-in 14 directly obtains a game list from the game server 40, and shows the game list to the inviter 10.

Step 4a3: The inviter messenger client 11 obtains online status of the invitee 20 via the messenger server 30, and the inviter 10 generates an invitation message via the inviter game client plug-in 14 after determining that the invitee 20 is online, and initiates a game invitation.

Step 4a4: The inviter messenger client 11 sends the generated invitation message to the invitee game client plug-in 24 via the messenger server 30. The invitation message includes, but is not limited to a UID of the inviter, specific game information, specific game subarea information, specific game room information, network environment information, etc.

Step 4a5: After receiving the invitation from the inviter messenger client 11, the invitee game client plug-in 24 gives a prompt that the invitation is received and determines whether to accept the invitation; if the invitation is not accepted, the invitee game client plug-in 24 directly terminates the invitation flow; otherwise, Step 4a6 is performed.

Step 4a6: The invitee messenger client 21 accepts the invitation, and sends a response message to the inviter game client plug-in 14 via the messenger server 30 to confirm the acceptance of the invitation, and starts the invitee game client 22. Then, the inviter 10 and the invitee 20 respectively perform Steps 4a7 and 4a8.

Step 4a7: The inviter game client plug-in 14 receives the response message, and starts the inviter game client 12. The inviter game client 12 logs on the game server 40, performs the identity authentication of the user information, and enters the game room determined in Step 4a3 after passing the authentication.

Step 4a8: The invitee game client 22 logs on the game server 40, performs the identity authentication of the user information, and enters the game room determined in Step 4a3 after passing the authentication.

FIG. 4b shows a flow that a messenger client initiates an invitation. As shown in FIG. 4b, the progress from initiating the invitation to entering a designated game room by the inviter and the invitee includes the following steps.

Step 4b1: When wishing to initiate a game invitation to the invitee 20, the inviter 10 first starts its own messenger client 11, generates and displays a game invitation interface.

Step 4b2: The inviter messenger client 11 directly obtains a game list from the game server 40, and shows the game list to the inviter 10.

Step 4b3: The inviter messenger client 11 obtains online status of the invitee 20 via the messenger server 30, and the inviter 10 generates an invitation message via the inviter messenger client 11 after determining that the invitee 20 is online, and initiates a game invitation.

Step 4b4: The inviter messenger client 11 sends the generated invitation message to the invitee messenger client 21 via the messenger server 30. The invitation message includes, but is not limited to a UID of the inviter, specific game information, specific game subarea information, specific game room information, network environment information, etc.

Step 4b5: After receiving the invitation from the inviter messenger client 11, the invitee messenger client 21 give a prompt that the invitation is received and determines whether to accept the invitation; if the invitation is not be accepted, and the invitee messenger client 21 directly terminates the invitation flow; otherwise, Step 4b6 is performed.

Step 4b6: The invitee messenger client 21 accepts the invitation, and sends a response message to the inviter messenger client 11 via the messenger server 30 to confirm the acceptance of the invitation, and starts the invitee game client 22. Then, the inviter and the invitee respectively perform Steps 4b7 and 4b8.

Step 4b7: The inviter messenger client 11 receives the response message, and starts the inviter game client 12. The inviter game client 12 logs on the game server 40, performs identity authentication of the user information, and enters the game room determined in Step 4b3 after passing the authentication.

Step 4b8: The invitee game client 22 logs on the game server 40, performs the identity authentication of the user information, and enters the game room determined in Step 4b3 after passing the authentication.

FIG. 4c shows a flow that an inviter messenger client triggers the game client to initiate an invitation. As shown in FIG. 4c, the progress from initiating the invitation to entering a designated game room by the inviter and the invitee is basically identical with that shown in FIG. 4b. The difference is that in FIG. 4c, the operations of generating and displaying a game invitation interface, generating an invitation message and initiating the invitation are completed by the inviter game client 12.

Hereinafter, respectively take that the inviter encrypts a game table and the invitee encrypts the game table as an example, the process for implementing the method of the present invention is further described with reference to FIGS. 5 and 6.

In a first embodiment, the inviter encrypts the game table.

Figure 5:
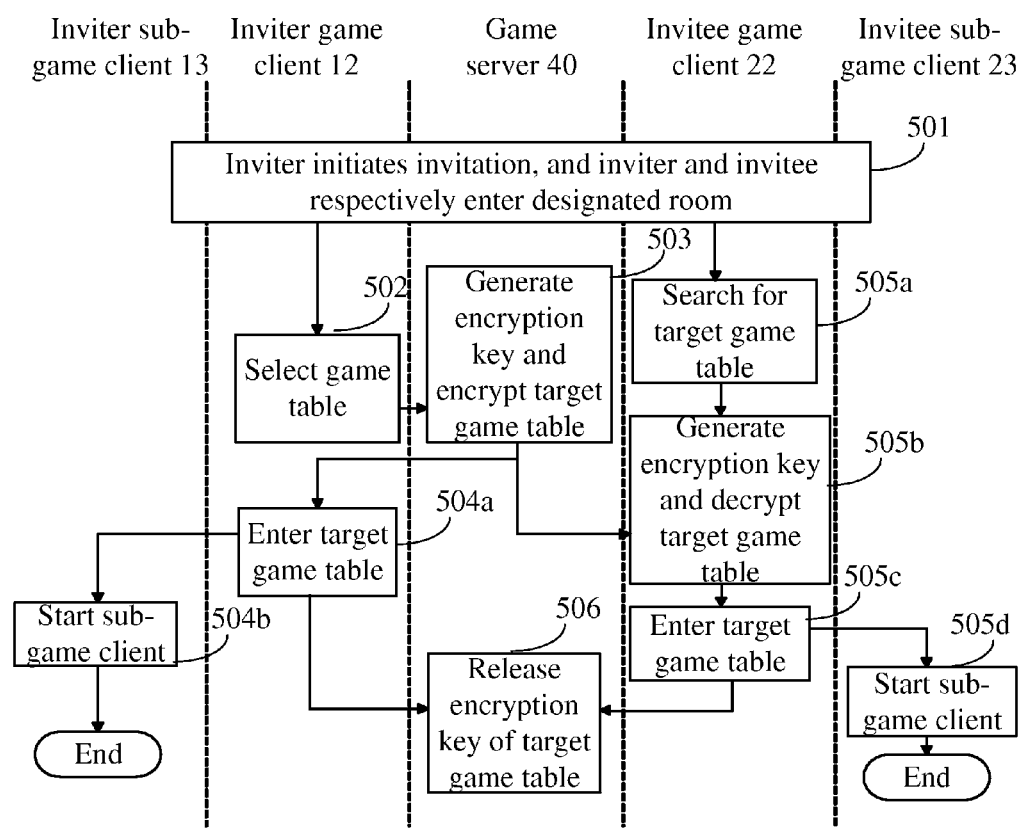
FIG. 5 is a simplified flowchart illustrating that an inviter encrypts a game table to implement an invitation according to an embodiment of the present invention.

As shown in FIG. 5, the flow of implementing an online game invitation method provided by this embodiment includes the following steps.

Step 501: The inviter initiates an invitation, and the inviter and the invitee enter a game room designated by the inviter after logging and passing the authentication.

This step can adopt any one of the flows shown in FIGS. 4a-4c.

Step 502: The inviter game client 12 automatically selects a game table meeting requirements as a target game table according to an unoccupied seat preselecting principle.

The selected target game table corresponds to the UID of the inviter. That is to say, after the target game table is selected, a corresponding relationship between the target game table and the UID of the inviter needs to be established.

Here, the unoccupied seat preselecting principle refers to that when selecting a game table, the game server 40 first selects a game table whose all seats are unoccupied currently, secondly, selects a game table whose one seat is occupied, and thirdly, selects a game table whose two seats are occupied, the rest may be deduced by analogy, until the game server 40 selects a game table whose two seats are unoccupied. Thus, it can be guaranteed that the invitation is successful.

Step 503: The inviter game client 12 generates an encryption key according to a predefined mode, and encrypts the target game table selected in Step 502 with the generated encryption key on the game server 40.

The encryption key can be generated adopting a special encryption algorithm, and can also directly adopt the UID of the inviter or the UID of the invitee.

Then, the inviter and the invitee respectively perform Steps 504a-504b and 505a-505d.

Steps 504a-504b: The inviter game client 12 enters the target game table, and starts the inviter sub-game client 13.

Steps 505a-505d: The invitee searches for the target game table selected by the inviter according to the UID of the inviter, generates an encryption key according to a predefined mode after searching out the target game table, and decrypts the target game table with the generated encryption key. Then, the invitee game client 22 enters the target game table and starts the invitee sub-game client 23.

Step 506: The game server 40 releases the encryption key of the target game table, i.e. unlocks the target game table, so that other users may enter the target game table to play a multi-person game The above mentioned is the process that a user invites another user to enter a same game table. If a user invites multiple users to enter a same game table to play a multi-person game, the above process may also be adopted. The multiple users may be taken as the invitee, and each invitee performs Steps 505a-505d, thus it can be guaranteed that all users are invited successfully. The game server 40 unlocks the target game table after all invited parties enter the target game table.

If the user who has entered the target game table invites other users to enter the target game table, the above process may also be adopted. The newly-invited user performs Steps 505a-505d; alternatively, the newly-invited user obtains the previous encryption key of the target game table from the game server 40, decrypts the target game table with the obtained encryption key and enters the target game table. Repeating in this way, it can be guaranteed that the all users are successfully invited.

In a second embodiment, the invitee encrypts the game table

Figure 6:
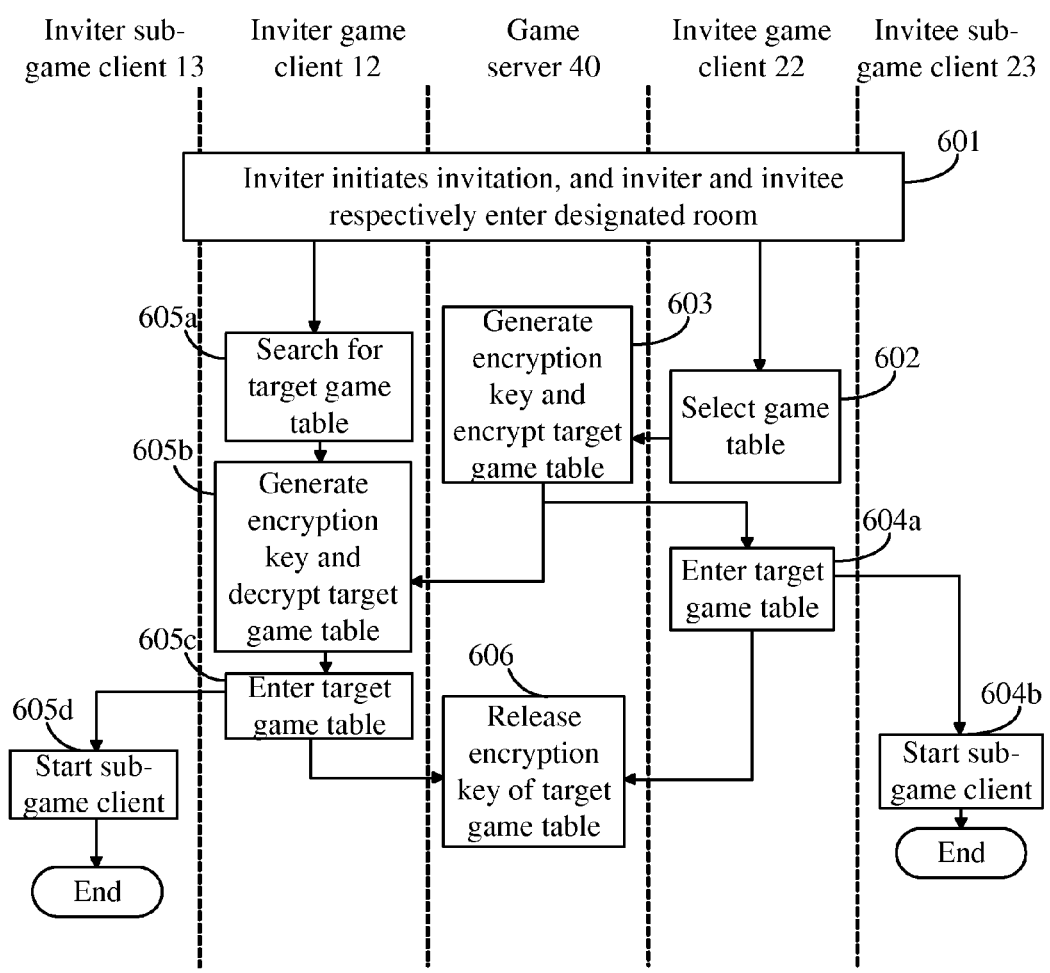
FIG. 6 is a simplified flowchart illustrating that an invitee encrypts a game table to implement an invitation according to an embodiment of the present invention.

As shown in FIG. 6, the flow of implementing an online game invitation method provided by this embodiment includes the following Steps.

Step 601: The inviter initiates an invitation, and the inviter and the invitee enter a game room designated by the inviter after logging and passing the authentication.

This Step can adopt any one of the flows shown in FIGS. 4a-4c.

Step 602: The invitee game client 22 automatically selects a game table meeting requirements as a target game table according to an unoccupied seat preselecting principle.

The selected target game table corresponds to the UID of the invitee. That is to say, after the target game table is selected, a corresponding relationship between the target game table and the UID of the invitee needs to be established.

Step 603: The invitee game client 22 generates an encryption key according to a predefined mode, and encrypts the target game table selected in Step 602 with the generated encryption key on the game server 40.

The encryption key can be generated adopting a special encryption algorithm, and can also directly adopt the UID of the inviter or the UID of the invitee.

Then, the inviter and the invitee respectively perform Steps 604a-604b and 605a-605d.

Steps 604a-604b: The invitee game client 22 enters the target game table, and starts the invitee sub-game client 23.

Steps 605a-605d: The inviter searches for the target game table selected by the invitee according to the UID of the invitee, generates an encryption key according to a predefined mode after searching out the target game table, and decrypts the target game table with the generated encryption key. Then, the inviter game client 12 enters the target game table and starts the inviter sub-game client 13.

Step 606: The game server 40 releases the encryption key of the target game table, i.e. unlocks the target game table, so that other users can enter target game table to play a multi-person game.

The above mentioned is the process that a user invites another user to enter a same game table. If a user invites multiple users to enter a same game table to play a multi-person game, one invitee performs Steps 602-604b, the rest each invitee performs Steps 605a-605d just as the inviter, and thus it can be guaranteed that all user are successfully invited. After all invited parties enter the target game table, the game server 40 unlocks the target game table.

If the user who has entered the target game table invites other users to enter the target game table, the above process may also be adopted. The newly-invited user performs Steps 605a-605d; alternatively, the newly-invited user obtains the previous encryption key of the target game table from the game server 40, decrypts the target game table with the obtained encryption key and enters the target game table. Repeating in this way, it can be guaranteed that all users are successfully invited.

In the embodiments of the present invention, after the inviter and the invitee confirm the invitation and enter the predefined game room, the inviter or the invitee that first obtains the target game table, i.e. the inviter or the invitee that first enters the target game table, generates the encryption key, and encrypts the obtained target game table on the game server. After determining the location of the target game table, the other one decrypts the target game table with the encryption key and enters the target game table. Thus, it can be guaranteed that the invitation process is not disturbed by other users and the two parties successfully enter the designated game table, thereby ensuring the success rate of the game invitation, and giving the users better game experiences. Besides, it can strengthen the protection logic of the game resources and ensure that the game invitation goes on wheels by adopting the mode of encrypting the game table.

In the embodiments of the present invention, the key is automatically generated on the client with the UID or the specific encryption algorithm, thus the user who first accesses the service component, i.e. the user who initiates the invitation or accepts the invitation, does not need to encrypt or decrypt the service component through manually inputting the key, that is to say, the encryption and decryption processes are transparent for the user, which makes the user execute the service faster, and saves corresponding system resources.

The foregoing is preferred embodiments of the present invention, and is not used for limiting the protection scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A service accessing control method, comprising:
   initiating, by a first client, a game invitation to at least one additional client, and generating a service group for executing an online game comprising the first client and the at least one additional client;
   wherein the first client and the at least one additional client are messenger clients, and respectively include a service function plug-in;
   wherein initiating, by the first client, the game invitation to the at least one additional client to generate the service group comprises:
   obtaining, by the service function plug-in of the first client, a game list from a server and generating the game invitation for executing the online game;
   wherein the number of clients allowed to access a game table is greater than or equal to the number of the clients in the service group;
      responding, by the at least one additional client, to the game invitation and participating in the service group;
      generating, by any of the clients in the service group, a key for the service group;
      searching, by any of the clients in the service group, for the game table on the server;
      accessing and encrypting, by the client that first searches out the game table, the game table with the generated key, and notifying the other clients in the service group;
      writing the key into an accessing right parameter of the game table;
      accessing, by the other clients in the service group, the encrypted game table with the generated key after receiving the notification from the client that first searches out the game table;
      saving, by the server, Unique Identities (UIDs) of all the clients in the service group;
      decrypting, by the server, the game table after determining that UIDs of clients that currently access the game table match the UIDs of a client in the service group;
      allowing, by the server, the accessing client to access the game table when the key sent from the selected client is identical with the key in the accessing right parameter; and
      deleting, by the server, the key in the accessing right parameter of the game table after decrypting the game table.

2. The method of claim 1, wherein notifying the other clients in the service group comprises notifying, by the client that first searched out the game table, the other clients in the service group of a UID of the client via the server.

3. The method of claim 2, wherein accessing, by the other clients in the service group, the encrypted game table with the generated key comprises:
   determining, by the other clients in the service group, the encrypted service group according to the UID of the client that first searched out the game table; and
   accessing, by the other clients in the service group, the encrypted game table with the generated key.

4. The method of claim 1, wherein generating the key for the service group comprises:
   predefining an aggregation of the UIDs of all the clients in the service group as a key packet generated for the service group; or
   generating, by each of the clients in the service group, the key according to a predefined encryption algorithm.

5. The method of claim 4, wherein the encryption algorithm comprises one of a Data Encryption Standard, algorithm, a 3DES algorithm, or a Diffie-Hellman algorithm.

6. A service accessing control system comprising:
   a service accessing control terminal;
   at least one additional client;
   a server;
   wherein the service accessing control terminal includes:
   a processor, memory, and a service function plug-in;
   wherein the service accessing control terminal is configured to: operate as a first client, obtain a game list from the server, generate a game invitation for executing an online game, initiate the game invitation to the at least one additional client to generate a service group including the first client and at least one additional client;
   wherein the number of clients allowed to access a game table is greater than or equal to the number of the clients in the service group;
   wherein the at least one additional client is configured to: respond to the game invitation received from first the client, and participate in the service group;
   wherein any of the said clients is configured to:
   generate a key for the service group, search for the game table in the server, access the game table when first searching out the game table, encrypt the game table with the generated key, write the key into the accessing right parameter of the game table, and notify the other clients in the service group;
   wherein the server is configured to:
   store and manage the game table, save Unique Identities (UIDs) of the first client and the at least one additional client of the service group;
   decrypt the game table after determining if UIDs of the accessing client currently accessing the game table match the UIDs of a client in the service group;
   allow the accessing client to access the game table when the key sent from the second selected client is identical with the key in the accessing right parameter;
   delete the key in the accessing right parameter of the game table after decrypting the game table.

* * * * *